W. SCHOEPKE.
SAFETY DEVICE FOR PULLEYS.
APPLICATION FILED JULY 18, 1913.

1,089,971.

Patented Mar. 10, 1914.

Witnesses
J. T. L. Wright
Dudley B. Howard

Inventor
William Schoepke
By Victor J. Evans.
Attorney

COLUMBIA PLANOGRAPH CO., WASHINGTON, D. C.

UNITED STATES PATENT OFFICE.

WILLIAM SCHOEPKE, OF HARTLAND, ILLINOIS.

SAFETY DEVICE FOR PULLEYS.

1,089,971.  Specification of Letters Patent.  Patented Mar. 10, 1914.

Application filed July 18, 1913. Serial No. 779,819.

*To all whom it may concern:*

Be it known that I, WILLIAM SCHOEPKE, a citizen of the United States, residing at Hartland, in the county of McHenry and State of Illinois, have invented new and useful Improvements in Safety Devices for Pulleys, of which the following is a specification.

This invention relates to a safety device for pulleys, the primary object being to provide a protective guard which is adapted to be applied to pulleys and in particular to friction clutch pulleys, so as to serve as means for deflecting the belt from the pulley when it has become disengaged with the same, whereby it will be prevented from becoming entangled within the friction clutch mechanism.

The embodiment of the invention described herein is designed as an improvement on the safety device included in my prior application for patent, bearing the Serial Number 740,016, filed January 3, 1913. In the above-mentioned application, the frusto-conical guard of the safety device is shown and described as having a smooth outer surface from which the unshipped belt will be deflected by gravity. In my improved safety device, the frusto-conical guard member is provided with outstruck spiral ridges or corrugations which will serve to eject the unshipped belt in a forcible manner from the guard member when the pulley upon which the device is mounted is rotating in the proper direction.

Figure 1:
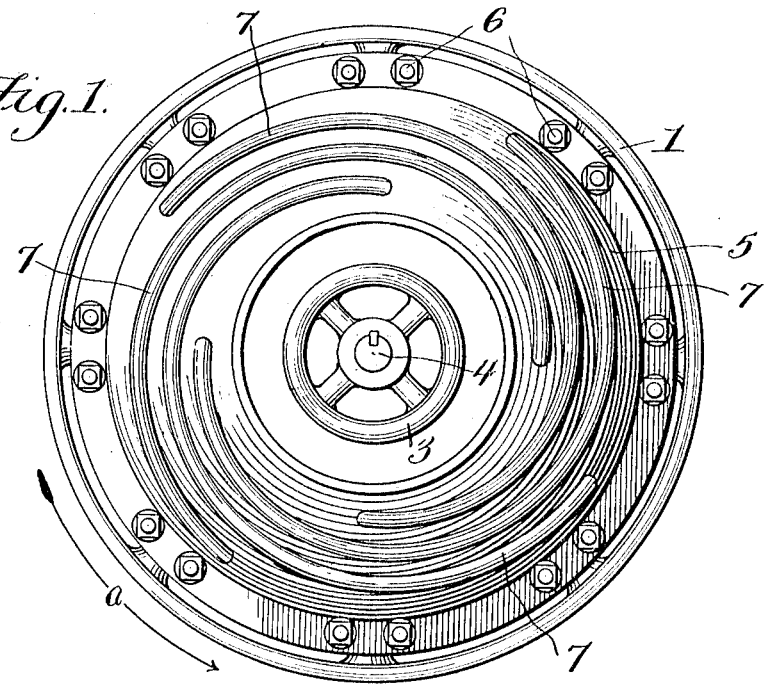
Figure 2:
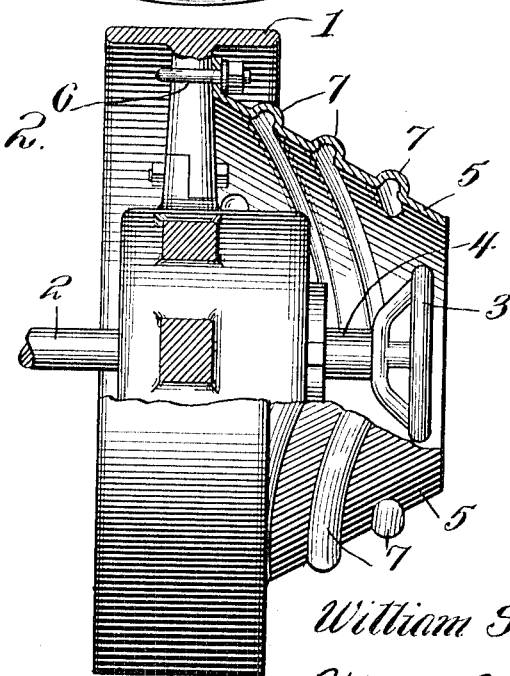

The invention consists in the features of construction, combination, and arrangement of parts, hereinafter fully described and claimed, reference being had to the accompanying drawing, in which:

Figure 1 is a fragmentary side elevation of the device in use upon a friction clutch pulley; and Fig. 2 is a fragmentary front elevation of the same.

In the drawing, the numeral 1 designates a pulley, which in this particular instance is of the friction clutch type and which is adapted to be used in connection with an engine or other prime mover. This pulley is necessarily provided with an operating shaft 2 and a hand wheel 3 upon the outer end thereof, by which the friction clutch mechanism of the said pulley may be adjusted to connect the pulley rigidly to the shaft 4 upon which it is mounted, or to render its connection therewith loose.

The safety device includes the frusto-conical guard member 5 whose large end is secured as at 6 to the spokes of the pulley, inwardly with respect to its rim. This guard member projects axially past the outer edge of the rim to a considerable extent and is provided upon its outer surface with a plurality of outstruck spirally disposed ridges 7. Each of these ridges terminates in spaced relation to the respective ends of the guard member and is formed so that it will serve to force an unshipped belt falling thereon axially and away from the pulley with its clutch mechanism, when the said pulley is rotating in the direction of the arrow *a* as shown in the drawing.

In practice, the ejecting ridges upon the guard member have been found to be useful in mounting a belt upon a pulley wheel to which the device is connected. In this operation, the belt is placed upon the outer periphery of the guard member and the pulley is rotated in the opposite direction to that indicated by the arrow *a*, whereupon the belt will be forced inwardly and radially with respect to the pulley to a position wherein it will be disposed in such proximity to the rim of the pulley that it may be forced onto the same by the operator's hands, without the necessity of employing crowbars, hooks, or the like.

The rapidity with which the belt will be thrown from the guard member will depend primarily upon the speed of rotation of the latter and will also depend upon the pitch of the ejecting ridges, and it is to be understood that slight changes in the details of construction, which fall within the scope of the appended claims, may be made if found necessary in practice.

Having thus described my invention, what I claim is:

1. In a device of the class described, the combination with a pulley wheel, of a hollow guard members secured to one end of the pulley inwardly with respect to its rim, the said member being extended axially past the adjacent edge of the wheel rim, and means provided upon the outer face of said guard member for forcing an unshipped belt falling thereon axially therefrom.

2. In a device of the class described, the combination with a pulley wheel, of a hollow guard member secured to one end of the pulley inwardly with respect to its rim, the said member being extended axially past the adjacent edge of the wheel rim, and an ejecting ridge formed on the outer surface of the said guard member and disposed at an angle to its longitudinal axis.

3. In a device of the class described, the combination with a pulley wheel, of a hollow guard member secured to one end of the pulley inwardly with respect to its rim, the said member being extended axially past the adjacent edge of the wheel rim, and a spirally extending ridge formed on the outer surface of the said guard member.

4. In a device of the class described, the combination with a pulley wheel, of a hollow guard member secured to one end of the pulley inwardly with respect to its rim, the said member being extended axially past the adjacent edge of the wheel rim, and a plurality of relatively spaced, spirally extending ridges formed on the outer periphery of the said guard member.

5. In a device of the class described, the combination with a pulley wheel, of a frusto-conical guard member disposed at one end of the pulley inwardly with respect to its rim with its large end disposed innermost, the said member being extended axially past the adjacent edge of the wheel rim, and a spirally extending ridge formed on the outer periphery of the said member.

In testimony whereof I affix my signature in presence of two witnesses.

WILLIAM SCHOEPKE.

Witnesses:
PERCY E. VOGEL,
GEORGE L. MURPHY.

Copies of this patent may be obtained for five cents each, by addressing the "Commissioner of Patents, Washington, D. C."